(12) United States Patent
Schweigl et al.

(10) Patent No.: US 10,201,863 B2
(45) Date of Patent: Feb. 12, 2019

(54) CHOP SAW FOR A CUTTING MACHINE

(71) Applicant: D. SWAROVSKI KG, Wattens (AT)

(72) Inventors: Johannes Schweigl, Mieming (AT); Joachim Karger, Vomp (AT); Gerhard Lindenthaler, Pettnau (AT); Andreas Mimm, Innsbruck (AT); Peter Schiffmann, Weerberg (AT)

(73) Assignee: D. Swarovski KG (AT)

( * ) Notice: Subject to any disclaimer, the term of this patent is extended or adjusted under 35 U.S.C. 154(b) by 0 days.

(21) Appl. No.: 15/561,356

(22) PCT Filed: Mar. 13, 2016

(86) PCT No.: PCT/EP2016/055385
§ 371 (c)(1),
(2) Date: Sep. 25, 2017

(87) PCT Pub. No.: WO2016/156018
PCT Pub. Date: Oct. 6, 2016

(65) Prior Publication Data
US 2018/0079018 A1  Mar. 22, 2018

(30) Foreign Application Priority Data
Mar. 28, 2015 (EP) .................................. 15161551

(51) Int. Cl.
*B23D 45/00* (2006.01)
*B23D 45/10* (2006.01)
(Continued)

(52) U.S. Cl.
CPC ......... *B23D 45/105* (2013.01); *B23D 45/003* (2013.01); *B23D 47/025* (2013.01); *B23D 59/02* (2013.01); *B27B 5/34* (2013.01)

(58) Field of Classification Search
CPC .... B23D 45/105; B23D 59/02; B23D 47/025; B23D 45/003; B27B 5/34
See application file for complete search history.

(56) References Cited

U.S. PATENT DOCUMENTS 3,148,570 A * 9/1964 Bogert .................... B26D 3/16
 82/53
3,955,455 A * 5/1976 Guzman .............. B23D 45/003
 83/409.1

(Continued)

FOREIGN PATENT DOCUMENTS

AT 11019 U1 3/2010
DE 1159622 B 12/1963
(Continued)

OTHER PUBLICATIONS

Rijks, Mark; European Search Report; European Application No. EP 15161551.5; dated Sep. 1, 2015; European Patent Office; Munich, Germany.
(Continued)

*Primary Examiner* — Sean Michalski
(74) *Attorney, Agent, or Firm* — Stevens & Showalter, LLP

(57) ABSTRACT

The invention relates to a chop saw for a cutting machine, having an axis of rotation (2) and comprising a circular first sawtooth disk (4) and a first carrier (3) holding the first sawtooth disk (4), wherein the first saw tooth disk (4) has a plurality of sawteeth (5) over the circumference thereof and/or on the flat surfaces thereof, and wherein the first carrier (3) is symmetrical along the axis of rotation (2), and wherein the first carrier (3) has, on a first carrier surface (7), a retaining mandrel (9) for holding the chop saw (1) in a machine chuck of the cutting machine, and wherein the first sawtooth disk (4) is positioned on a second carrier surface (8) of the first carrier (3), which faces away from the first carrier surface (7), and wherein the chop saw (1) has a second sawtooth disk (11), which is arranged parallel to the (Continued)

Figure 1:
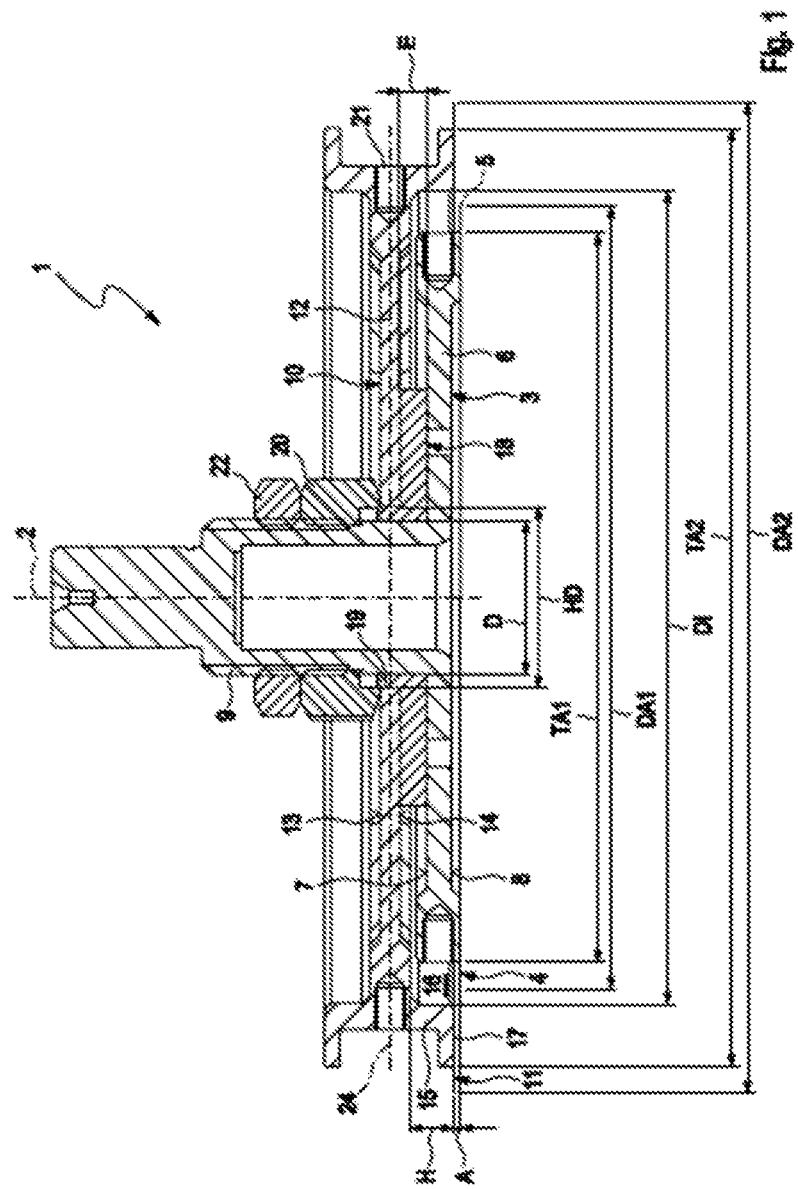

first sawtooth disk (4). According to the invention, an outside first disk diameter (DA1) of the first sawtooth disk (4) is smaller than an outside second disk diameter (DA2) of the second sawtooth disc (11), and an axial distance (A) is formed between the first sawtooth disk (4) and the second sawtooth disk (11).

14 Claims, 5 Drawing Sheets

(51) Int. Cl.
*B27B 5/34* (2006.01)
*B23D 47/02* (2006.01)
*B23D 59/02* (2006.01)

(56) References Cited

U.S. PATENT DOCUMENTS

| | | | |
|---|---|---|---|
| 4,033,319 A * | 7/1977 | Winter | B23D 47/005 125/13.01 |
| 6,576,531 B2 * | 6/2003 | Peng | B23D 59/002 257/E21.238 |
| 7,258,052 B1 * | 8/2007 | McLean | B26D 7/088 83/168 |
| 2011/0000416 A1 * | 1/2011 | Wiggins | B26D 1/20 114/20.3 |

FOREIGN PATENT DOCUMENTS

| | | |
|---|---|---|
| DE | 3715578 A1 | 11/1988 |
| DE | 202006017955 U1 | 2/2007 |
| EP | 1252957 A1 | 10/2002 |

OTHER PUBLICATIONS

Rijks, Mark; International Search Report and Written Opinion; International Application No. PCT/EP2016/055385; dated Jun. 28, 2016; European Patent Office; Rijswijk, Netherlands.

* cited by examiner

CHOP SAW FOR A CUTTING MACHINE

FIELD OF THE INVENTION

The invention relates to a chop saw for a cutting machine according to the preamble of claim 1.

PRIOR ART

Chop saws for cutting machines are known. The chop saws generally comprise a support which receives a saw blade or a saw tooth disc such that said part cannot move. The support is non-rotatably connected to the cutting machine, and a rotating shaft of the cutting machine drives the chop saw, it being possible for said saw to machine or trim a workpiece while rotating.

One significant difference between a chop saw and a circular saw is a machining or working direction of the saws with respect to a blank or workpiece. If, for example, the blank or workpiece has a longitudinal axis of which the direction corresponds to the working direction of the circular saw, the working direction of the chop saw is transverse to this direction.

DE 32 18 562 A1 for example discloses a circular saw for a cutting machine. The saw blade comprises a surface portion that contains abrasive grain in order to delay blunting of the saw blade.

DE 20 2004 009 761 U1 discloses a chop saw comprising a support and a saw blade, the support and the saw blade being bonded and welded to one another in order to produce a non-rotatable connection.

AT 11 019 U1 and DE 20 2006 017 955 U1 each disclose a scoring device for a circular saw comprising two saw blades. Scoring devices are used to prevent shearing and/or flaking during a sawing process, the scoring device usually having a direction of rotation that is counter to the circular saw. The saw blades of the scoring device are arranged so as to be mutually parallel, and have the same outer diameter. In addition, they are designed to form scored grooves of shallow depths, but not to trim, i.e. carry out a complete separation.

EP 1 252 957 A1 discloses a circular saw comprising a chain drive or a belt drive. The circular saw comprises two saw blades, arranged so as to be mutually parallel, each saw blade being attached to a support associated therewith by means of spot welding. The drive is provided between the two asymmetrical supports, which are arranged so as to face one another, the two supports being connected to the drive by means of a bolt-nut connection.

DE 37 15 578 A1 discloses a circular saw head for a circular saw. The circular saw comprises two saw blades, and is designed to produce an outer sideboard and an inner sideboard from a log in a single step. In order to prevent the inner sideboard jamming between the two saw blades, it is necessary for both saw blades to have the same outer diameter.

DE 1 159 622 B discloses a machining tool for wood. Since the machining tool is a tool comprising milling discs, and is provided for machining, teeth of the milling discs are arranged on the milling disc thereof so as to be mutually offset over the circumference. However, the teeth are formed so as to intersect one another in the axial orientation thereof in order to provide a width of cut without any gaps.

Nevertheless, several operations are required in order to produce workpieces, such as cubes or prisms, from a blank when using the known chop saws. As a result, producing cubes or prisms is costly in terms of both time and money.

The object of the present invention is that of providing a chop saw for a cutting machine which reduces the number of operations for producing workpieces.

DESCRIPTION OF THE INVENTION

This object is achieved according to the invention by a chop saw for a cutting machine having the features of claim 1. Advantageous embodiments comprising expedient and non-trivial developments of the inventions are provided in the respective dependent claims.

The chop saw according to the invention for a cutting machine, comprising an axis of rotation, has a first circular saw tooth disc and a first support which receives the first saw tooth disc. The first saw tooth disc has a plurality of saw teeth, which are arranged over the circumference thereof and/or on the end faces thereof. The first support is axially and rotationally symmetrical to the axis of rotation. In order to receive the chop saw in a machine chuck of the cutting machine, the first support comprises a retaining mandrel on a first support surface. The first saw tooth disc is positioned on a second support surface of the first support, which surface is remote from the first support surface. The chop saw comprises a second saw tooth disc, which is arranged in parallel with the first saw tooth disc. A first outer disc diameter of the first saw tooth disc is smaller than a second outer disc diameter of the second saw tooth disc, and there is an axial spacing between the first saw tooth disc and the second saw tooth disc.

Chop saws typically have only one saw tooth disc. The significant advantage is that, owing to the plurality of saw tooth discs, which are arranged so as to be mutually parallel, the number of method steps for producing workpieces, such as prisms or cubes, is reduced.

Preferably, a first outer disc diameter of the first saw tooth disc is smaller than a second outer disc diameter of the second saw tooth disc, and therefore the first saw tooth disc can be positioned in a region of the second saw tooth disc which is free of saw teeth. This results in the chop saw having a compact design.

When determining the disc diameters, particular care should be taken that the first disc diameter is not too small relative to the second disc diameter, thereby avoiding too great a difference in cutting speeds between the two saw tooth discs.

A further advantage is that removing the workpieces in the form of cuboids, cubes or prisms is made easier by means of a cooling lubricant applied during the trimming process, and it is possible to prevent the workpieces jamming between the saw blades.

In particular, the first saw tooth disc, which has the first disc diameter that is smaller than the second disc diameter, is the component of the chop saw which provides a bottommost surface of the chop saw. The bottommost surface is to be considered as the surface of the chop saw that is remote from the retaining mandrel. During operation, the bottommost surface is the closest surface of the chop saw facing the blank. The second saw tooth disc is axially offset with respect to the first saw tooth disc at a specific spacing in the direction of the retaining mandrel. During operation, on account of the larger second disc diameter, the second saw tooth disc therefore trims the blank in a first plane, and the first saw tooth disc trims the blank in a second plane, the first plane of the chop saw being closer than the second plane. Owing to centrifugal forces which occur, the workpieces released by the second saw tooth disc leave the chop saw in an outer region of the chop saw, or they are slung away from the chop saw. Likewise owing to centrifugal forces which occur, the workpieces released by the first saw tooth disc, however, leave the chop saw from a region of the chop saw which is offset radially inwards with respect to the outer region. If the difference between the first disc diameter and the second disc diameter is too great, the workpieces could reach the first saw tooth disc and the second saw tooth disc and become jammed here. The disc diameters should be determined based on the size of the workpiece.

In one embodiment, the first saw tooth disc is connected to the second saw tooth disc for conjoint rotation. The advantage is that the connection for conjoint rotation ensures that a rotational speed of the first saw tooth disc corresponds to a rotational speed of the second saw tooth disc. As such, a simple drive and therefore a simple tool can be produced.

In a further embodiment of the invention, a second support is provided, which is designed to receive the second saw tooth disc. The advantage is that the second saw tooth disc can be formed independently of the first support. As such, an axial spacing between the two saw tooth discs can easily be changed, for example by replacing the second support. This is not possible if both saw tooth discs are attached to the first support.

In a further embodiment, the second support and the first support are coaxial, and the second support is designed to predominantly enclose the first support in the direction of the axis of rotation. Advantageously, this results in a simple assembly, but prevents improper assembly. In addition, the balancing quality can be increased owing to the coaxial design.

In order to continue the compact design of the tool, a second support disc of the second support comprises a through-opening which passes completely through the second support disc. The retaining mandrel of the first support can be pushed through this through-opening. The second support therefore does not require its own retaining mandrel in order to be attached in the machine, but instead the retaining mandrel of the first support can be used. The first support therefore also has a retaining function with respect to the chop saw. The second support is simply placed on the first support, and is non-rotatably connected thereto. Therefore, the second support can be in the form of an annular disc, and can thus have a compact design. A further advantage of the retaining mandrel receiving the second support disc by means of the through-opening thereof is that of centering the second support disc on the first support. The balancing quality can thus be further increased.

In a further embodiment, the first saw tooth disc is integrally bonded to the first support such that a non-rotatable connection is provided in a simple manner.

In a further embodiment, the second saw tooth disc is integrally bonded to the second support. This means that the second saw tooth disc is likewise non-rotatably connected to the second support in a simple manner.

If the saw tooth discs have to be replaced, the integrally bonded connection, which is usually provided using an adhesive, is broken under heat, the surface of the support is cleaned and a new saw tooth disc is integrally bonded to the support.

In order to produce different spacings between the first saw tooth disc and the second saw tooth disc, a spacer is arranged between the first support and the second support. Using the spacer, the spacing between the saw tooth discs can easily be varied and adjusted based on the material to be separated and/or based on a specific size of the workpieces. The spacer, which is formed in a suitable shape and in the manner of a perforated disc, is simply positioned between the two saw tooth discs, which are coaxial, as a result of which an axial spacing between the discs is set based on an axial expansion of the spacer. The spacer itself is likewise preferably coaxial with the saw tooth discs, and, when designed to be annular, can centrally receive the retaining arm. This results in both the second saw tooth disc and the spacer being centred on the first support.

In a further embodiment, the first support and the second support are non-positively and/or positively interconnected. A non-positive connection is preferably designed to be detachable, as a result of which the two supports can be replaced without any issues. A positive connection can prevent relative twisting between said supports, thus ensuring the non-rotatable connection. A positive connection can be provided for example by designing opposing surfaces of the first support and the second support to be complementary, in part.

In a further embodiment of the chop saw according to the invention, a collar which fully encloses the second support disc of the second support is positioned on the second support disc, asymmetrically with respect to a plane of symmetry of the second support disc, in the extension of said collar which is formed in the direction of the axis of rotation. In this case, a first collar portion, which extends from the plane of symmetry and which is formed on a support surface of the second support disc which faces the retaining mandrel, is larger than a second collar portion which is remote from this support surface. This asymmetry reduces or prevents deflection of the second support disc which is evident as a result of centrifugal forces occurring at high speeds. In other words, this results in stability of the chop saw.

Figure 2:
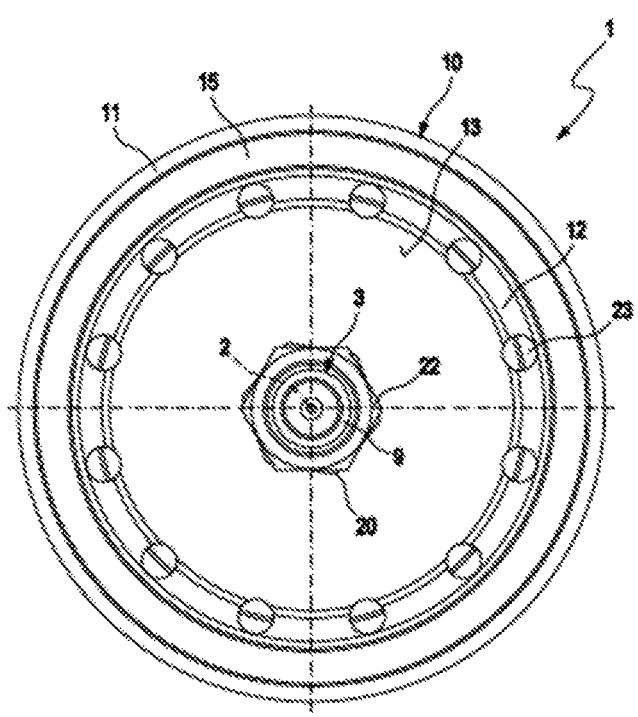
Figure 3:
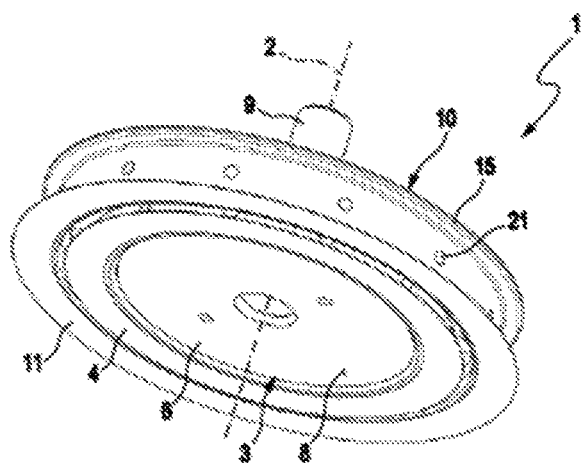
Figure 4:
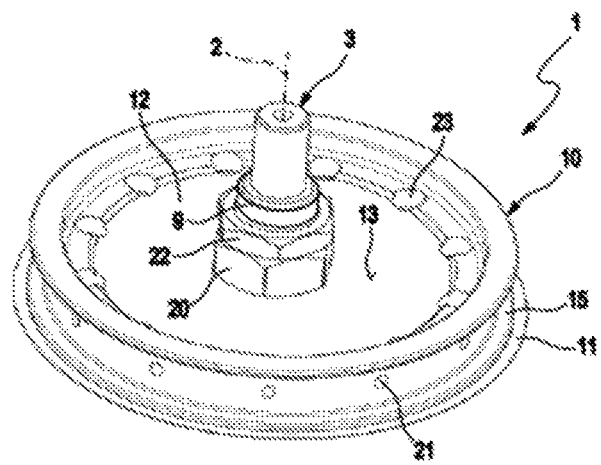
Figure 5:
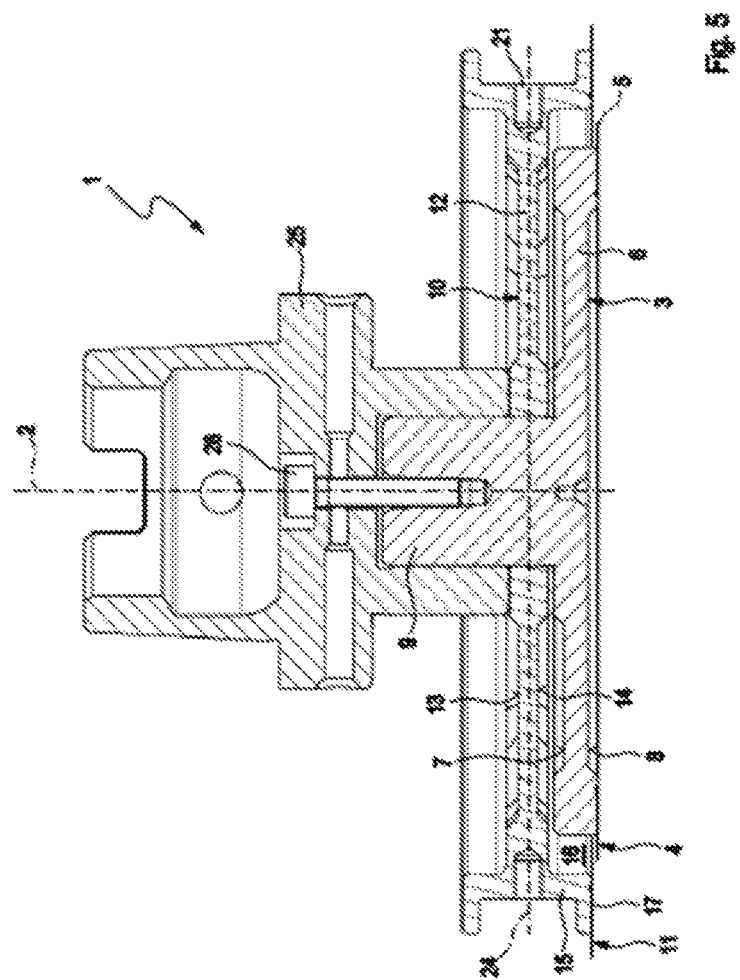
Figure 6:
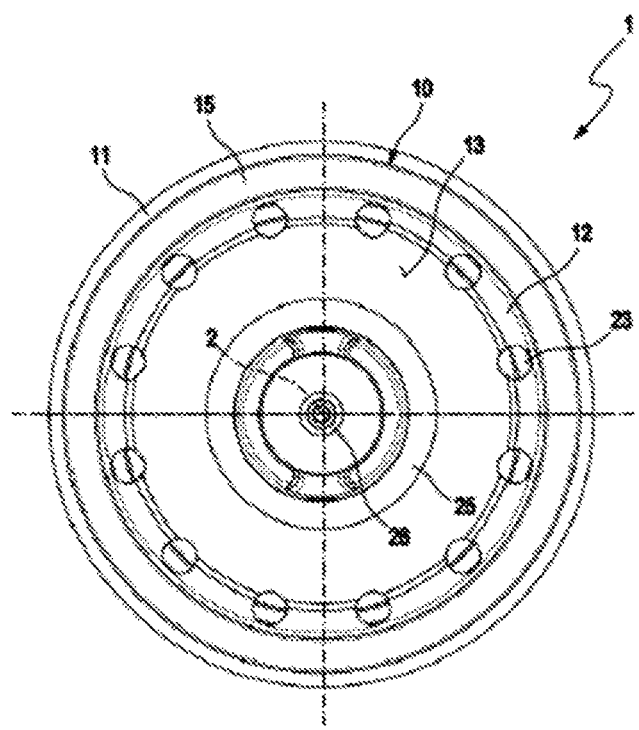

Further advantages, features and details of the invention can be found in the following description of preferred embodiments and with reference to the drawings. However, the features and combinations of features mentioned above in the description and mentioned below in the description of the figures, and/or features and combinations of features shown only in the figures, can be implemented not only in the combination specified in each case, but rather also in any other combinations or individually, without departing from the scope of the invention. The same or functionally similar elements are provided with identical reference signs. For reasons of clarity, it is possible that the elements may not be provided with their reference signs in all the figures, but the association remains. In the figures:

FIG. 1 is a longitudinal section of a chop saw according to the invention for a cutting machine, FIG. 2 is a plan view of the chop saw according to FIG. 1, FIG. 3 is a perspective view from below of the chop saw according to FIG. 1, FIG. 4 is a perspective view from above of the chop saw according to FIG. 1, FIG. 5 is a longitudinal section of a variant of the chop saw according to the invention for a cutting machine, and FIG. 6 is a plan view of the chop saw according to FIG. 5.

A chop saw 1 according to the invention for a cutting machine (not shown in greater detail) is composed according to a structure shown in FIG. 1. The chop saw 1 is symmetrical relative to its axis of rotation 2. When the chop saw 1 is operated together with the cutting machine, the axis of rotation 2 corresponds to a rotational axis of the chop saw 1.

The chop saw 1 comprises a first support 3 and a first saw tooth disc 4 which is non-rotatably received on the first support 3. The first saw tooth disc 4 is circular, and comprises a plurality of saw teeth 5 for producing a free cut. The plurality of saw teeth 5 be formed over the circumference of the first saw tooth disc 4 and/or on the end faces thereof.

The first support 3 comprises a first support disc 6 having a first support surface 7 and a second support surface 8. Said disc comprises a retaining mandrel 9 on the first support surface 7 thereof, which mandrel is integral with the first support disc 6. The retaining mandrel 9 is arranged concentrically with respect to the first support disc 6. The first support 3 is symmetrical relative to the axis of rotation 2.

The first saw tooth disc 4 is received on the second support surface 8, the second support surface 8 being remote from the first support surface 7. In other words, the first saw tooth disc 4 is received on the first support 3, remote from the retaining mandrel 9.

The first saw tooth disc 4 is integrally bonded to the first support 3. The integrally bonded connection can be produced using a suitable adhesive, it also being possible to weld or solder the two components 3 and 4 when the first support 3 and the first saw tooth disc 4 are made of suitable materials.

The chop saw 1 comprises a second support 10. The second support 10 is designed to receive a second saw tooth disc 11. The second saw tooth disc 11 can be arranged in parallel with the first saw tooth disc 4 by means of the second support 10. The second saw tooth disc 11 is circular and, as with the first saw tooth disc 4, comprises a plurality of saw teeth 5 for producing a free cut. The plurality of saw teeth 5 can be arranged over the circumference of the second saw tooth disc 11 and/or on the end faces thereof.

For a compact arrangement of the first saw tooth disc 4 and the second saw tooth disc 11, the second support 10 comprises a second support disc 12, on the circumference of which a collar 15 is formed which extends over a third support surface 13 of the second support disc 12 and a fourth support surface 14. In other words, the collar 15 is designed to enclose the second support disc 12 over the circumference thereof. By means of this collar 15, a first cavity 16 of the second support 10 is formed on the fourth support surface 14, in which cavity the first support disc 6 of the first support 3 is to be arranged.

In addition, by means of said collar 15, at the end 17 of which that extends over the fourth support surface 14 the second saw tooth disc 11 is non-rotatably and integrally bonded to the second support 10, an axial spacing A between the first saw tooth disc 4 and the second saw tooth disc 11 can be set. This means that the spacing A between the first saw tooth disc 4 and the second saw tooth disc 11 can be formed based on a collar height H of the collar 15 formed between the fourth support surface 14 and the second support surface 11.

The collar 15 is positioned on the support disc 12, asymmetrically with respect to a plane of symmetry 24 of the second support disc 12, in the extension of said collar which is formed in the direction of the axis of rotation 2. Said collar could likewise also be formed on the support disc 12 so as to be symmetrical with respect to the plane of symmetry 24.

A discoid-like spacer 18 is arranged between the first support 3 and the second support 10, by means of which spacer the spacing A can additionally be varied. An axial support spacing between the first support disc 6 and the second support disc 12 can be adjusted according to the axial extension E of said spacing, as a result of which the axial spacing A between the first saw tooth disc 4 and the second saw tooth disc 11 is adjusted.

The first saw tooth 4 has a first outer disc diameter DA1 which is larger than a first outer support diameter TA1 of the first support 3. In other words, the first saw tooth disc 4 is designed to project radially beyond the first support 3. The second saw tooth disc 11 has a second outer disc diameter DA2 which is larger than a second outer support diameter TA2 of the second support 10. This means that the second saw tooth disc 11 is designed to project radially beyond the second support 10. The radial extension of the saw tooth discs 4, 11 beyond the respective supports 3, 10 depends on a depth of cut to be achieved.

In order to easily position the first support 3 in the cavity 16, the first disc diameter DA1 of the first saw tooth disc 4 is smaller than a first inner diameter DI of the second support 10, which cavity is formed by means of the collar 15. The difference between the two diameters is preferably determined based on the size of a workpiece, in order that workpieces that are cut off when the blank is trimmed cannot accumulate in an intermediate space between the two saw tooth discs 4, 11 and possibly jam.

The second support 10 comprises a centrally positioned receiving opening 19 for receiving the retaining mandrel 9. An opening diameter D of the receiving opening 19 is larger than a retaining mandrel outer diameter HO of the retaining mandrel 9, such that the retaining mandrel 9 is positioned so as to be enclosed by the second support 10. In other words, the second support 10 is designed to predominantly enclose the first support 3 in the direction of the axis of rotation 2. The first support 3 and the second support 10 are coaxial.

In order to produce a non-rotatable connection between the first support 3 and the second support 10, the first support 3 and the second support 10 are non-positively and positively interconnected. For this purpose, a cap nut 20 is arranged on the retaining mandrel 9 so as to enclose said mandrel. By means of the cap nut 20, which can be positioned along the axis of rotation 2, the second support 10 is braced against the first support 3 in the direction of the axis of rotation 2.

The retaining mandrel 9 is designed to non-rotatably receive the chop saw 1 in a machine chuck (not shown in greater detail) of the cutting machine. An additional cap nut 22 is used to secure the cap nut 20.

Balancing bores 21 are formed over the circumference of the second support 10. Said balancing bores 21 are used to ensure a balanced rotation of the chop saw 1. For this purpose, balancing markings (not shown in greater detail) can for example be inserted into the balancing bores 21.

FIGS. 5 and 6 show a variant of the chop saw 1 according to the invention in a further embodiment. The retaining mandrel 9 is received in a conical retaining element 25 in a torsion-proof manner. For the non-rotatable connection of the retaining element 25 to the retaining mandrel 9, and thus for the non-rotatable connection of the retaining element 25 to the first support 3, a securing element 26 is designed to positively and non-positively connect the retaining element 25 and the retaining mandrel 9. In the embodiment shown, the securing element 26 is in the form of an Allen screw.

The second support 10 comprises the through-openings 23 that pass completely through the second support disc 12. During operation of the cutting machine comprising the chop saw 1 according to the invention, a cooling lubricant can be fed through said through-openings 23 in the first saw tooth disc 4 with the aid of the gravitational and centrifugal force. The cooling lubricant is used to cool the first saw tooth disc 4 and the second saw tooth disc 11. In addition, the cooling lubricant is used to remove the workpieces, such as the prisms or cubes, produced using the chop saw 1.

In a further embodiment (not shown in greater detail), the chop saw 1 comprises a third support which is designed to predominately enclose the second support 10 in the direction of the axis of rotation 2.

The invention claimed is:

1. Chop saw for a cutting machine, comprising an axis of rotation and having a first circular saw tooth disc and a support which receives the first saw tooth disc, the first saw tooth disc having a plurality of saw teeth over the circumference thereof and/or on the end faces thereof, and the first support being symmetrical along the axis of rotation, and the first support having a retaining mandrel on a first support surface for receiving the chop saw in a machine chuck of the cutting machine, and the first saw tooth disc being positioned on a second support surface of the first support, which surface is remote from the first support surface, and the chop saw having a second saw tooth disc which is arranged in parallel with the first saw tooth disc, characterised in that a first outer disc diameter (DA1) of the first saw tooth disc is smaller than a second outer disc diameter (DA2) of the second saw tooth disc, and an axial spacing (A) being formed between the first saw tooth disc and the second saw tooth disc.

2. Chop saw according to claim 1, characterised in that the first saw tooth disc is connected to the second saw-tooth disc for conjoint rotation.

3. Chop saw according to claim 1, characterised in that a second support is formed which is designed to receive the second saw tooth disc.

4. Chop saw according to claim 3, characterised in that the second support and the first support are coaxial, and the second support being designed to predominately enclose the first support in the direction of the axis of rotation.

5. Chop saw according to claim 3, characterised in that a second support disc of the second support comprises a through-opening that passes completely though the second support disc.

6. Chop saw according to claim 5, characterised in that a collar which completely encloses a second support disc of the second support is positioned on the second support disc, asymmetrically with respect to a plane of symmetry of the second support disc, in the extension of said collar which is formed in the direction of the axis of rotation.

7. Chop saw according to claim 3, characterised in that the second saw tooth disc is integrally bonded to the second support.

8. Chop saw according to claim 3, characterised in that a spacer is arranged between the first support and the second support.

9. Chop saw according to claim 8, characterised in that the spacer determines the axial spacing (A) between the first saw tooth disc and the second saw tooth disc.

10. Chop saw according to claim 3, characterised in that the first support and the second support are non-positively interconnected.

11. Chop saw according to claim 3, characterised in that the first support and the second support are positively interconnected.

12. Chop saw according to claim 3, characterised in that the first support and the second support are non-positively and positively interconnected.

13. Chop saw according to claim 1, characterised in that the first saw tooth disc is integrally bonded to the first support.

14. Chop saw according to claim 1, characterised in that the first saw tooth disc is positioned in a region of the second saw tooth disc which is free of saw teeth.

* * * * *